May 5, 1964     P. E. YOST     3,131,889
BALLOON STRUCTURE WITH RELEASE MECHANISM
Filed Oct. 16, 1961     3 Sheets-Sheet 1
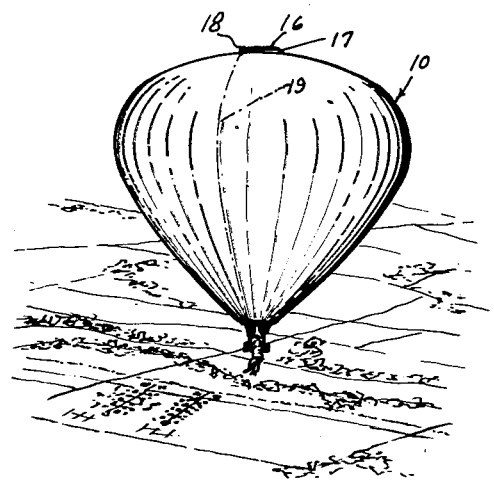
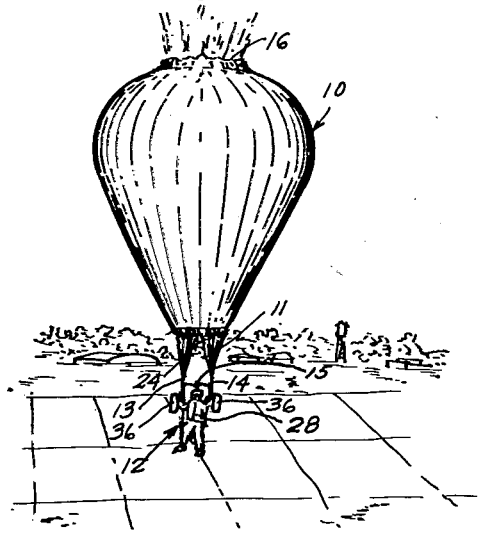
INVENTOR.
Paul E. Yost
BY
ATTORNEYS

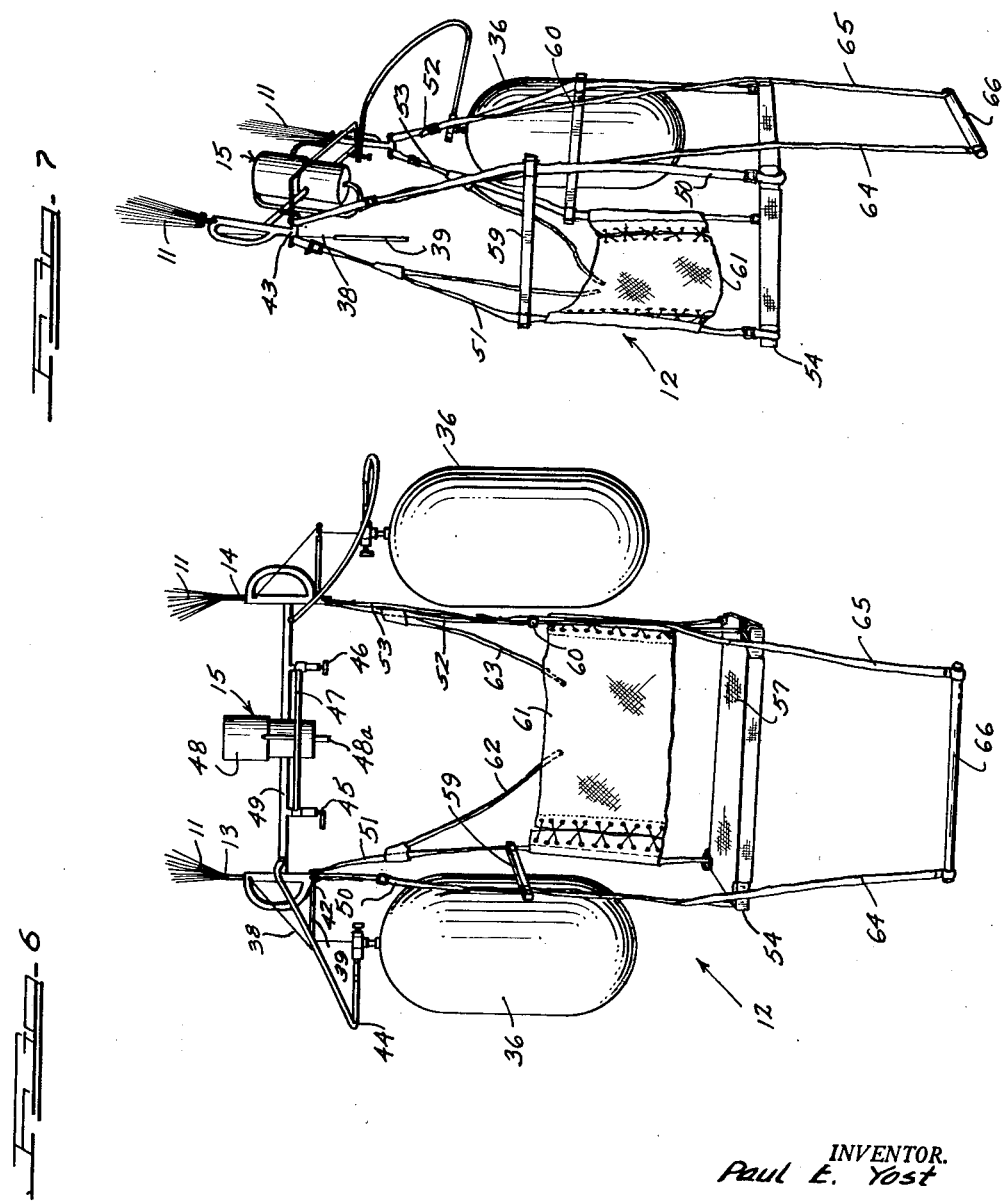

May 5, 1964 P. E. YOST 3,131,889
BALLOON STRUCTURE WITH RELEASE MECHANISM
Filed Oct. 16, 1961 3 Sheets-Sheet 3
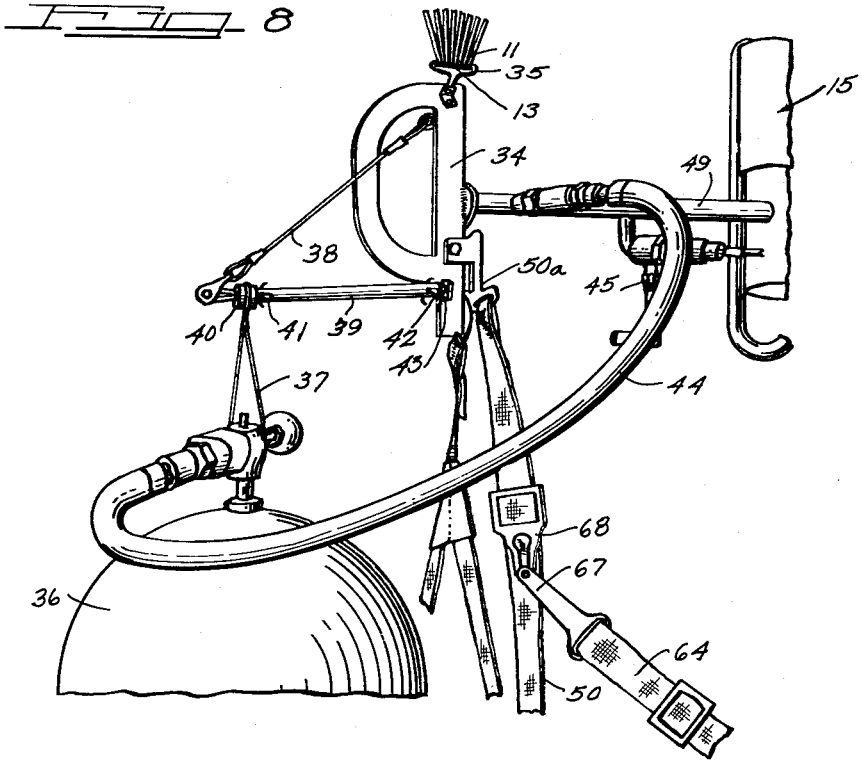
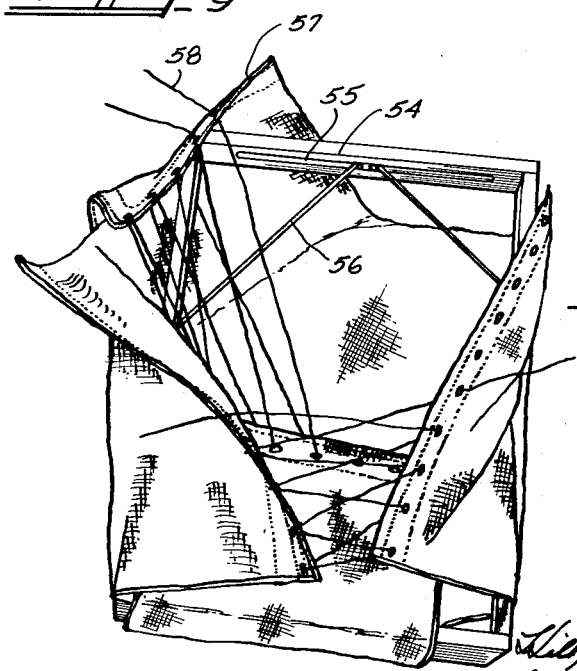
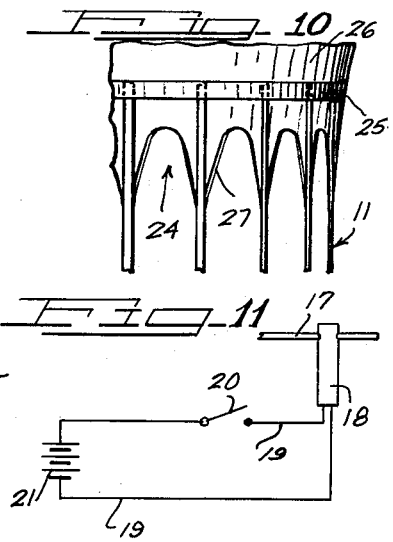
INVENTOR.
Paul E. Yost
BY
ATTORNEYS United States Patent Office 3,131,889
Patented May 5, 1964

3,131,889
BALLOON STRUCTURE WITH RELEASE
MECHANISM
Paul E. Yost, Sioux Falls, S. Dak., assignor to Raven
Industries, Inc., Sioux Falls, S. Dak., a corporation
of South Dakota
Filed Oct. 16, 1961, Ser. No. 145,229
8 Claims. (Cl. 244—31)

The present invention relates to improvements in balloons and particularly to a manned flight balloon for carrying a rider aloft with the rider controlling the ascent and descent of the balloon.

Balloons flights of long duration and practical flight such as for scientific purposes have currently all employed hydrogen or helium as a lifting gas. Hot air balloons have been known for many years in the past but heretofore been impractical for inexpensive flights of long duration and despite the problems and expense of using lifting gas such as hydrogen or helium it has been almost exclusively used currently. In 1783 the Montgolfier brothers in France accomplished man's first method of flight by encasing hot smoke in a fabric balloon envelope. Hot air balloons were flown but used crude and difficult heat sources such as burning straw. Due to its limited altitude capabilities (only 15,000 feet) the hot air balloon has not been utilized as a scientific research vehicle; except for occasions as barnstorming exhibitions, the hot air balloon technique has been dormant for substantially in the past 170 years. It has been impractical to obtain manned flights of long duration and flights have required awkward unsafe equipment or required the provision of expensive compressed lifting gas which could not be supplied to the balloon during flight over long periods.

A feature of the present invention is the provision of a balloon structure which makes possible the practical use of the hot air balloon for various purposes thus avoiding the difficulties which necessarily accompany using expensive compressed lighter than air gas for balloons which is substantially limited to ground inflation, and utilizing the numerous advantages of heated air as a lifting gas for balloons.

It is an object of the present invention to provide a balloon with improved features which make it possible to carry a man aloft on an altitude controlled flight for a predetermined extended length of time and wherein the balloon is constructed of a lightweight relatively inexpensive material which is re-usable, and is not susceptible to damage by scuffing or contact with sharp objects of rough surfaces.

A further object of the invention is to provide an improved balloon system wherein mechanism is carried on the balloon for generating the lifting gas while in flight and lifting gas can be rapidly and controllably generated to easily and quickly control altitude, and the lifting gas is relatively inexpensively provided with a fuel source having sufficient capacity so that the balloon does not have to be impervious and is substantially unaffected by numerous holes.

A further object of the invention is to provide an improved balloon inflation mechanism for use on the ground and in flight, capable of rapid inflation and providing heated lifting gas to the balloon envelope so that the outer surface remains ice free.

A still further object of the invention is to provide a manned flight balloon with improved safety features for descent at a safe rate and for a safe landing and wherein descent can occur even with the loss of the supply of lifting gas.

Other objects, advantages and features will become more apparent with the teachings of the principles of the present invention in connection with the disclosure of the preferred embodiment thereof in the specification, claims and drawings, in which:

FIGURE 1 is a perspective view of a balloon in flight constructed in accordance with the principles of the present invention;

FIGURE 2 is a perspective view showing the balloon just at the time of landing;

FIGURE 3 is a side elevational view of a balloon provided with means for retarding rate of descent;

FIGURE 4 is a fragmentary detailed sectional view taken substantially along line IV—IV of FIGURE 3;

FIGURE 4a is a horizontal fragmentary sectional view taken substantially along line IVa—IVa of FIGURE 3;

FIGURE 5 is a greatly enlarged sectional view illustrating the construction of the material of the balloon;

FIGURE 6 is a front elevational view showing the construction of the balloon seat;

FIGURE 7 is a perspective view of the balloon seat;

FIGURE 8 is a fragmentary detailed perspective view illustrating one of the suspension points and its associated mechanism for supporting elements from the balloon;

FIGURE 9 is a perspective view with parts partially disassembled, of the bottom of the seat;

FIGURE 10 is a fragmentary elevational view of the arrangement for connecting the load tapes to the base of the balloon; and FIGURE 11 is a diagrammatic view of wiring for opening the balloon top and terminating the flight.

As shown on the drawings:

FIGURES 1 through 3 show a balloon or balloon envelope 10 filled with a heated lifting gas and being rounded at the upper end with a tapered lower end. At the lower end are attached load lines or tapes 11 which may be substantially uniformly spaced in a circumferential direction, and which are gathered or separated at their lower ends into two groups to lead to suspension points 13 and 14 which are laterally separated. This provides two concentrated suspension points for supporting the side of a seat for a rider, and maintains the lines or tapes 11 separated so that heated lifting gas can pass upwardly into the open lower end of the balloon.

Suspended from the load tapes 11 is a seat 12 which will be described in greater detail in connection with FIGURES 6, 7 and 9.

Between the suspension points and coaxially located with respect to the balloon is a lifting gas generating burner 15.

The upper end of the balloon is provided with a gas emptying opening or port 16 which during normal flight conditions, as illustrated in FIGURE 1, is closed. Various closing means may be provided, but as illustrated the material of the balloon is reefed or gathered together at the upper end and secured by a band or cord 17. The cord passes through a cutting squib 18 which is capable of cutting the cord and is operated at the end of the flight to rapidly empty the balloon of its lifting gas at a predetermined emptying rate.

For opening the top of the balloon, the squib 18 may be electrically operated, and as illustrated in FIGURE 11 is connected to an electrical circuit through a wire 19. The wire 19, as shown in FIGURE 1, runs down the side of the balloon either on the exterior or interior surface, and is connected to a switch 20 which is mounted at a location available to the rider 28 in the seat, for firing the squib and terminating the flight just before he reaches the ground. The switch is shown at 20 in FIGURE 11 and the circuit is operated by a suitable battery 21 supported from the load tapes 11. When the rider 28 is a small distance above the ground, he closes the switch 20 and fires the squib 18, permitting the rapid escape of gas through the top of the balloon.

The gas escapes at a controlled rate which is determined by the size of the opening 16. The opening is selected to be of a size which will reduce the free lift of the balloon at a rapid rate and collapse the balloon within a few seconds so that it will not be caught by the wind to drag the rider 28 along the ground. However the opening 16 is not sufficiently large so that it will lose free lift at a rate to drop and injure the rider.

An optimum size of opening 16 has been found to be substantially of a diameter wherein the ratio of the opening size in square feet to the volume of the balloon in cubic feet is 1 to 200. It has been found that this ratio of size can be within the range of 1 to 150 to 1 to 500, within the principles of the invention. If the opening is made smaller than the limits of the range, deflation will occur too slowly and the balloon can be caught by the winds to drag the rider along the ground. If the opening is made larger than the limit of the range, the gas will be released too rapidly and the rider will be dropped at rates which may injure him.

The load tapes at the bottom of the balloon are connected to the balloon material 26 by extending a horizontal tape 25 circumferentially around the apex of the balloon, as shown in FIGURE 10. The material at the base of the balloon is cut in scallops 27, and the vertical tapes 11 are each run down the center of the points of the scallops and attached at their upper ends to the horizontal tape 25. The tapes may be attached such as by stitching to the balloon material.

The lower end or apex of the balloon is open, and the burner 15 is coaxial with the opening 24. The opening 24 is of a size so that the combustion gases rising from the burner 15 do not burn the balloon material, and is chosen to be of such a size that it will tend to capture air as the balloon descends to have a parachute effect and retard the rapid descent of the balloon. Thus, in the event of a flame-out with the rider being unable to get the burner relighted, the rate of descent will be retarded to reduce the chance of injury to the rider.

For example, in a balloon constructed and flown in accordance with the principles of the present invention, a 457 pound gross load was flown to an altitude of over 7,000 feet, and the burner was intentionally extinguished. It was found that the descent rate averaged 817 feet per minute, which is in a relatively safe range and would not cause serious injury to a rider.

The relatively light weight of the balloon aids in making possible long range flights and accurate control of ascent, and the balloon material, as shown in FIGURE 5, employs an outer scuff-proof layer 30 of woven material which is pervious to gas but which has the tensile strength necessary to withstand the stresses and abrasions which will occur to the balloon material. An inner layer 31 is formed of a thin lightweight gas impervious plastic material which in itself is incapable of withstanding the stresses but which prevents the gas from passing through the outer layer 30. The layers are superimposed or laminated to each other and may have a bonding material 32 therebetween. The outer layer 30 may be of woven nylon fabric, although other lightweight woven fabrics such as formed of other plastics or cotton may be employed. The inner layer may be of a thin lightweight Mylar film, and other thermoplastics such as polyethylene are suitable. The combined weight of the material is on the order of .91 ounce per square yard, and has a tensile strength of 50 pounds per inch.

The load tapes 11, FIGURE 8, are attached to an eyelet member 35 at the top of a connector 34 at each side. Since the construction of the sides at the suspension points 13 and 14 is substantially identical, only one side need be described in detail, as illustrated in FIGURE 8. Fuel tanks 36 are supported at each side of the seat, and mechanism is provided for dropping the tanks when they are exhausted.

This tank supporting and dropping mechanism may take various forms, and is shown as including a short cable 38 secured at its upper end to the connector 34 and at its lower end to the outer end of a rod 39 which is hollow to slide over the end of a stud 43 on the connector, and is held to the stud by a cotter pin 42. The fuel tank is supported on a short cable 37 connected to an eyelet 40 which is slidable on the rod 39 and is held in position by a cotter pin 41. The fuel tank supplies fuel to the burner 15 through a flexible conduit 44 which connects to a hollow spreader bar 49 extending across between the connectors at the base of the suspension points 13 and 14. The spreader bar 49 is formed in two parts and supports the burner 15 therebetween above the head of a rider on the seat 12. When the tank 36 of FIGURE 8 is to be dropped, the cotter pins 41 and 42 are pulled, and the fuel tank 36 is pushed outwardly by the rider thus pushing the rod 39 off the end of the stud 43 so that it drops downwardly to the position shown in FIGURE 7. This permits the collar 40 to slide off the rod 39 and the fuel container 36 drops to the ground.

Fuel to the burner 15 from the containers 36 is controlled by a pair of valves 45 and 46, and these valves are arranged to operate in parallel for controlling the flow of fuel to the burner 15, with valve 46 being a graduated valve of the needle type which can be adjusted by the rider, and 45 being a quick acting boost valve for greatly increasing the flame in the burner when opened for a rapid supply of lifting gas. Fuel flows from the valves to a common connector 47 and to a pre-heat jacket 48 around the top of the cylindrical hollow burner 15 and down through a line 48a up to a burner nozzle within the center of the cylindrical shell of the burner. Air flows up through the center of the burner to mix with the burning gases so that heated lifting gas flows up into the opening 24 at the base of the balloon. The relatively lightweight of the overall balloon, and the production of heated lifting gas in the manner described, permits the gas to be generated inexpensively and relatively long duration flights can be obtained. Further, loss of gases to the seams of the balloon or through holes is not serious since lifting gas can be generated easily at a sufficient rate to replace lost gases. Further the heated lifting gas will rise up into the center of the balloon so that cool gases descend downwardly out along the outer wall of the balloon and loss of the cooled gases is not of great consequence. Fuel such as propane is convenient for the burner although other types of fuel may be carried by the containers 36.

The connector 34 is provided with eyelet member 50a to which the upper ends of the pair of seat lines or tapes 50 and 51 are connected. The seat lines thus merge to a point at their upper ends and spread outwardly to be connected to a seat frame 54 at their lower ends. Similar seat lines 52 and 53 are at the other side of the seat frame suspended below the suspension point 14, as shown in FIGURES 6 and 7.

The seat frame, FIGURE 9, is formed of a wooden rectangle with wood bars secured at their ends, and the bars being slotted as shown at 55 for resiliency and weight reduction, and for running lacing lines 56 through the slots to reinforce the bars. For supporting an individual on the seat frame, a seat canvas 57 is drawn thereover by lacing 58.

Side members 59 and 60 extend between the seat lines of each pair at each side of the seat, and a backrest 61 extends between the back seat lines 51 and 53, with a backrest being additionally supported by lines 62 and 63 extending downwardly from the seat lines 51 and 53.

The front of the seat is supported by a freely swinging footrest 66 carried at the lower ends of footrest lines 64 and 65 which are removably attached at their upper ends to the seat lines 50 and 52 in the manner shown in FIGURE 8. A connector 67 at the top of the footrest line 64 is slid into the slot of a member 68 attached to the seat line 50, and with this arrangement the footrest lines can be removed.

FIGURE 3 illustrates an arrangement where additional means are provided to reduce the rate of descent of the balloon, and a horizontal circumferentially extending skirt 69 is attached to the balloon envelope 10 preferably at the point of largest circumference or the equator thereof. As illustrated in FIGURES 4 and 4a, the upper edge of the skirt is continuously attached to the balloon envelope wall at 71, and the skirt is flared at the base to form an air catching pocket 70 when the balloon descends. The flared skirt will drop downwardly against the side of the balloon when it is ascending without offering restraint to ascension. Small air escape ports 78 may be provided at the upper end of the pockets. The skirt also provides additional insulation preventing loss of heat from the gas within the balloon to the atmosphere.

The skirt is conveniently formed in pockets by being secured to the balloon at the seams between the gores. As shown in FIGURE 4a, the balloon envelope has gores 72 and 73 joined at a seam 74 by stitching 75. While the balloon envelope may be constructed in various ways, construction in gores is convenient and obtains the shape desired. It has been found advantageous to simply form the seam between the gores, when material such as that of FIGURE 5 is used, by stitching. Various types of stitched seams may be employed such as with a doubled over or overlapping arrangement, and for convenience of illustration a butt type of seam is shown in FIGURE 4a. In any event, the stitching permits the escape of water vapor between the layers of material so that the seams dry out and so that vapor is not captured therebetween to tend to force the seams apart.

The skirt is preferably located at the equator of the balloon, or at the location of maximum diameter.

The balloon skirt is attached or conveniently caught between the gores at the seam 74 so as to form a series of pockets 77 and 76.

In operation, the rider is positioned in the seat 12 and has convenient access to the control valves 45 and 46 which are directly above his head. The valves are also close to the burner 15, and thereby control the valves so the horizontal path of flight (the altitude as the balloon moves horizontally with air currents) of the balloon is easily controlled. The rider 28 may also carry an igniting mechanism or a match for re-igniting the burner in the event a flame-out occurs, and the burner is accessible for this purpose. When a flight is to be terminated, the flame of the burner is reduced or cut off so that the balloon will descend to the ground, and descent will be arrested and slowed by the parachute effect of the opening 24 at the apex of the balloon, and will also be arrested by the skirt 69 if a skirt is employed. Just before the rider reaches the ground, the free lift of the balloon will be rapidly dropped by firing the squib 18 and releasing the material to provide the opening 16 at the upper end. The rider will then be quickly lowered to the ground and the balloon will collapse in the matter of a few seconds to prevent it being caught by the wind.

Thus it will be seen that I have provided an improved hot air balloon capable of carrying various types of loads and capable of manned and controlled flight, and which meets the objectives and advantages above set forth.

The drawings and specification present a detailed disclosure of the preferred embodiment of the invention, and it is to be understood that the invention is not limited to the specific for misclosed, but covers all modifications, changes and alternative constructions and methods falling within the scope of the principles taught by the invention.

I claim as my invention:

1. A balloon structure comprising a plurality of gores formed of an outer scuff-proof material with an inner layer of gas impervious plastic, said gores joined at seams to form a balloon envelope, and stitching forming the sole bond for said seams to permit the escape of moisture and prevent the build up of moisture pressure between the layers of material at the seams.

2. A manned flight balloon structure comprising a balloon inflatable with a lifting gas and having an opening at the lower end, load lines arranged around the opening and extending downwardly to two laterally spaced suspension points, a rigid gas flow conduit extending rigidly between said points secured at its ends to the lines at said points and maintaining said points spaced, a burner for producing lifting gas centrally located below said opening and supported on said conduit, vertically downwardly extending seat lines connected to said points, and a seat suspended between said seat lines below said burner.

3. A balloon structure comprising a balloon formed of vertical gores joined at their edges by vertical seams and shaped with a rounded upper end and a downwardly tapered lower end with an opening at the apex, means for supporting a pay load beneath the balloon, a burner mounted on said supporting means centrally positioned beneath said opening for generating a lifting gas to flow upwardly through the opening, and pockets formed at the sides of the balloon with each pocket formed of flexible material secured at its upper edge to the balloon to form the top of the pocket and secured along its side to the seams of the gores to form the sides of the pocket with the base of the pocket open to flare outwardly when the balloon descends and to drop freely downwardly against the balloon when the balloon ascends.

4. In a balloon structure, a balloon envelope inflatable with a lifting gas, a large opening at the balloon envelope base for receiving a mixture of air and gas, a burner mounted below said opening, electrical means for forming an opening at the upper end of the balloon envelope at the termination of a flight sufficiently large for rapidly collapsing the balloon envelope by permitting gas to pass out the top and permit rapid entry of air at the opening at the balloon base, a seat supported at the lower end of the balloon envelope for securing a rider, and a switch connected to said electrical means in a position accessible to said seat so that the rider may open the balloon envelope before the seat reaches the ground.

5. In a manned flight balloon structure;
  a balloon envelope inflatable with a lifting gas, means for inflating the balloon,
  an opening formed by the balloon envelope at the upper end thereof,
  a seat supported at the lower end of the balloon envelope for securing a rider,
  said opening having a fully open area of a ratio to the inflated volume of the balloon envelope of between 1:150 and 1:500 wherein the opening is sufficiently large for rapidly collapsing the balloon envelope by permitting gas to pass out the top thereof,
  opening means connected to said balloon upper end to close said opening during flight and to fully open said opening when desired,
  a switch means connected to the opening means in a position accessible to said seat so that the rider may open the balloon envelope opening before the seat reaches the ground.

6. In a manned flight balloon structure as described in claim 5, the ratio of the fully open opening area to the inflated volume of the balloon being approximately 1:200.

7. In a balloon structure as described in claim 4, said large opening at the balloon envelope base being sufficiently large to capture a substantial amount of air during rapid descent of the balloon and retard descent to a safe rate.

8. In a balloon structure as described in claim 4,
   a plurality of gores formed of an outer scuff-proof material with an inner layer of gas impervious plastic,
   said gores joined at seams to form the balloon,
   stitching forming the sole bond for said seams to permit the escape of moisture and prevent the build up of moisture pressure between the layers of material at the seams, and
   pockets formed at the sides of the balloon with each pocket formed of flexible material secured at its upper edge to the balloon to form the top of the pocket and secured along its side to the seams of the gores to form the sides of the pocket with the base of the pocket open to flare outwardly when the balloon descends and to drop freely downwardly against the balloon when the balloon ascends.

References Cited in the file of this patent

UNITED STATES PATENTS

| | | |
|---|---|---|
| 330,705 | Hook | Nov. 17, 1885 |
| 953,591 | Bringham | Mar. 29, 1910 |
| 1,553,340 | Upson | Sept. 15, 1925 |
| 1,563,571 | Huffman et al. | Dec. 1, 1925 |
| 2,728,540 | Ebneter | Dec. 27, 1955 |
| 2,756,948 | Winzen et al. | July 31, 1956 |
| 2,823,876 | Ebneter | Feb. 18, 1958 |
| 2,839,123 | Summitt | June 17, 1958 |
| 2,858,090 | Winzen et al. | Oct. 28, 1958 |
| 2,864,569 | Froehlich | Dec. 16, 1958 |
| 2,993,663 | Froehlich | July 25, 1961 |
| 2,996,112 | Arndt | Aug. 15, 1961 |

FOREIGN PATENTS

| | | |
|---|---|---|
| 17,383 | Great Britain | June 18, 1903 |
| 344,591 | Germany | Nov. 25, 1921 |